United States Patent [19]

Pippert

[11] Patent Number: 4,899,483
[45] Date of Patent: Feb. 13, 1990

[54] WEEDLESS HOOK

[75] Inventor: Aaron J. Pippert, Houston, Tex.

[73] Assignee: Utex Industries, Inc., Houston, Tex.

[21] Appl. No.: 242,032

[22] Filed: Sep. 8, 1988

[51] Int. Cl.⁴ .............................................. A01K 83/00
[52] U.S. Cl. ...................................... 43/43.6; 43/43.2;
43/43.4; 43/42.39; 43/42.42
[58] Field of Search ..................... 43/43.2, 43.4, 43.6,
43/42.39, 42.42

[56] References Cited

U.S. PATENT DOCUMENTS

| | | | |
|---|---|---|---|
| 828,964 | 8/1906 | Phelps | 43/43.6 |
| 1,208,936 | 12/1916 | England | 43/43.6 |
| 1,992,766 | 2/1935 | Pflueger . | |
| 2,090,571 | 8/1937 | Coffin | 43/43.4 |
| 2,185,507 | 1/1940 | Knapp | 43/43.2 |
| 2,241,320 | 5/1941 | Sarff | 43/43.6 |
| 2,458,988 | 5/1948 | Lobdell . | |
| 2,468,988 | 5/1949 | Lobdell . | |
| 2,615,277 | 10/1952 | Hayden | 43/43.2 |
| 2,630,649 | 3/1953 | Arbogast . | |
| 2,664,662 | 1/1954 | Larson | 43/43.6 |
| 2,700,240 | 1/1955 | Gibbs . | |
| 2,785,498 | 3/1957 | Youngquist | 43/43.4 |
| 3,231,999 | 2/1966 | Gurka | 43/42.42 |
| 3,400,484 | 9/1968 | Beard | 43/43.2 |
| 3,640,014 | 2/1972 | Gurka | 43/43.6 |
| 3,670,446 | 6/1972 | Wheeler . | |
| 4,123,870 | 11/1978 | Wiskuchen | 43/42.39 |
| 4,672,768 | 6/1987 | Pippert . | |

FOREIGN PATENT DOCUMENTS 21172  10/1903  United Kingdom ................. 43/43.6

Primary Examiner—Kurt Rowan
Attorney, Agent, or Firm—Browning, Bushman, Zamecki & Anderson

[57] ABSTRACT

A fishing hook includes a guard for preventing weeds from inadvertently snagging or contaminating the hook, while enabling the guard to flex toward the shank of the hook to catch a fish. The flexible sheet-like metallic guard is secured at one end to the hook adjacent the eye, and has an opposing free end normally positioned between the barbed tip of the hook and the eye. The guard lies within a plane substantially perpendicular to the hook plane, and has a width substantially greater than its thickness such that the end of the guard is prevented from moving in a direction perpendicular to the hook plane and out of alignment with the barbed tip, while the guard may freely flex toward the shank of the hook to catch fish.

17 Claims, 3 Drawing Sheets

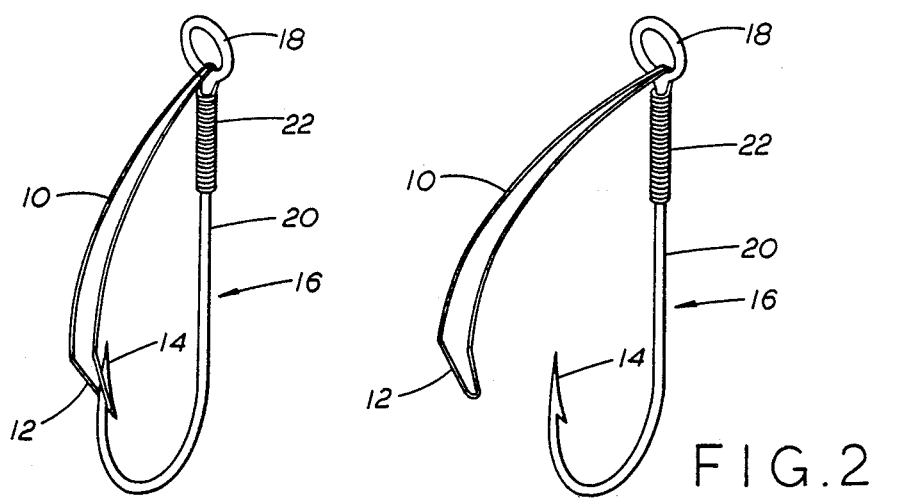
FIG.1 (PRIOR ART)
FIG.2 (PRIOR ART)
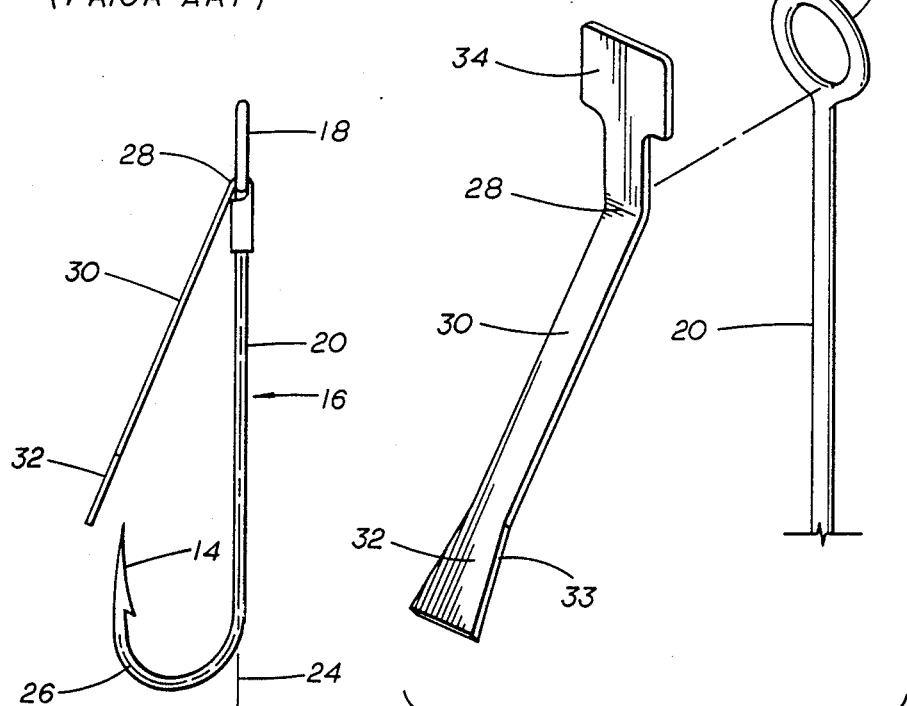
FIG.3
FIG.4

WEEDLESS HOOK

BACKGROUND OF THE INVENTION

1. Field of the Invention

The present invention relates to fishing hooks and, more particularly, to weedless fishing hooks for preventing weeds or similar submerged objects from inadvertently snagging the hook or contaminating the hook and/or lure.

2. Description of the Background

When fishing in water containing seaweed or when fishing adjacent a grassy bed, fishermen have long experienced problems with the fishing hook becoming snagged on the grass or weeds, so that the hooked grass thereafter travels through the water with the bait or lure, either creating an unnatural appearance to the fish and/or covering the barbed tip of the hook so that a striking fish will not likely be caught. Similarly, when fishing in a stream with submerged tree branches or roots, the hook often snags and then becomes deeply lodged in the submerged wood, and the fly or bait is lost trying to dislodge the snag. If the hook can not be dislodged, the line must be cut and rerigged. Since these problems have long existed, it is not surprising that special hooks and lures have been devised, generally referred to as weedless hooks or lures, to overcome this problem.

One type of weedless hook employs a wire guard attached at one end to a spoon, lure, or hook, with the free end of the wire generally positioned adjacent the barbed end of the hook to prevent weeds from engaging the barbed end and/or to deflect the hook around a sumberged branch or other more stable submerged object. U.S. Pat. No. 1,992,766 discloses a fishing or trolling spoon with a light flexible weed guard comprising a pair of wires, with one end of the wires secured to the spoon and the free end of each of the wires on opposing sides of the barbed hook. A fishing lure with a curving wire weed guard soldered or welded to the hook is disclosed in U.S. Pat. No. 2,468,988. The weed guard may then be attached to a selected spoon at the fishing site to make the lure ready for use. A steel wire guard secured to an artificial lure is disclosed in U.S. Pat. No. 2,630,649. The free end of the wire guard has deflecting portions which extend on opposite sides of the barbed end of the hook. U.S. Pat. No. 2,700,240 discloses a wire member with an arm normally juxtaposed to the barb to serve as a weed guard, while another arm enables the wire to be secured to the lure.

Probably the most popular type of weed guard in use today, as shown in FIGS. 1 and 2, employs a wire 10 configured to form a loop end 12 which normally engages the barbed end 14 of the hook 16. The wire 10 may pass through the eye 18 of the hook, and be secured to the shank 20 by a string-like wrapping 22. In theory, the wire 10 deflects the weeds from the barbed end 14, and/or deflects the barbed end of the hook out of the path of the wood or other submerged object. When a fish strikes the hook, however, the wire easily flexes toward the shank 20, so that the barbed end 14 is exposed to catch the fish. A device similar to that shown in FIGS. 1 and 2 is disclosed in U.S. Pat. No. 3,670,446, wherein a tubular shaped wire-like guard normally has one end covering the tip end of the hook.

In practice, it is difficult to keep the hook end 12 of the wire guard as shown in FIGS. 1 and 2 continually aligned with the barbed end 14 of the hook. Since the wire must be flexible to easily bend toward the shank when a fish strikes the bait or lure, it also easily bends laterally out of the plane of the hook, e.g. when the wire guard 10 hits the water or strikes a submerged article. The biasing action of the wire normally is intended to hold the looped portion 12 against the barbed end 14, so that the looped end 12 automatically springs past the barbed end 14, as shown in FIG. 2, any time the loop end is not restricted by engagement with the barbed end 14 of the hook, e.g. if it is deflected toward the shank and simultaneously or subsequently deflected laterally out of alignment with end 14. This action has several significant drawbacks: (1) since the wire 10 is out of the plane of the hook, the barbed end 14 is free to engage weeds or other debris, thereby obviating the "weedless" feature of the hook, and (2) if a fish should strike the bait on the hook or the lure adjacent the hook once the wire springs past the guard as shown in FIG. 2, the looped end 12 of the wire 10 may engage the barbed end 14 of the hook, but be prevented from moving toward the shank 20 by the barbed end 14 and thereby preventing the fish from being caught.

The disadvantages of the prior art are overcome by the present invention, and an improved weedless hook is hereinafter disclosed which satisfies the need for a reliable yet relatively inexpensive weedless hook which may be used in conjunction with various baits or lures to catch fish.

SUMMARY OF THE INVENTION

The fishing hook of the present invention may be used to catch fish in water with seaweeds, slime, weeds, tree branches, tree roots, or similar fully or partially submerged objects which may inadvertently snag or contaminate the fishing hook. Since weeds are a common source of snags, the device of the present invention may be generally referred to as a type of weedless hook, although it should be understood that the hook of the present invention functions substantially in the same manner regardless of the submerged object which it engages.

The fishing hook of the present invention includes a conventional hook having an eye, a shank, and an arcuate portion with a barbed tip at one end. A resiliently flexible sheet-like metallic guard may be secured to the shank of the hook adjacent the eye, and has an opposing free end positioned between the barbed tip and the eye, preferably close to the tip. The width of the sheet-like guard lies substantially perpendicular to the plane of the hook, and is substantially greater than its thickness. The width of the guard thus prevents its free end from moving in a lateral direction perpendicular to the hook plane and out of alignment with the barbed tip during normal use of the hook, while the thickness of the guard allows flexible movement of the free end within the hook plane and toward the shank axis of the hook. The free end of the guard is thus normally spaced from the shank axis of the hook to deflect weeds around the barbed tip of the hook, and is easily moved toward the shank axis to expose the barbed tip so that the fish may be hooked.

It is an object of the present invention to provide a highly reliable weedless hook which continually prevents weeds from engaging the tip end of the hook during use.

It is another object of the present invention to provide a weedless hook with a sheet-like guard having a width substantially greater than its thickness, and with the width of the guard lying in a plane substantially perpendicular to the plane of the hook.

It is a feature of the present invention that the weedless hook guard may pass through the eye of the hook and be clamped to the shank of the hook to easily and reliably secure the guard to the hook.

It is another feature of the invention that the weedless hook guard may be formed from a flexible metal sheet to reduce manufacturing costs.

An advantage of a hook having a sheet guard according to the present invention is that the free end of the guard may be provided with an enlarged width end, thereby further minimizing the likelihood that the free end of the guard will move out of alignment with the plane of the hook.

It is another advantage of the present invention that the sheet-like guard may be easily formed with a reducedwidth portion and an enlarged width portion for enabling the guard to be more easily and reliably attached to the hook.

These and other objects, features and advantages of the present invention will become apparent from the following detailed description, wherein reference is made to the figures in the accompanying drawings.

BRIEF DESCRIPTION OF THE DRAWINGS

FIG. 1 is a pictorial view of the prior art weedless hook with a looped end of the wire guard in engagement with the barbed end of the hook.

FIG. 2 is a pictorial view of the device shown in FIG. 1 illustrating a problem which may occur when the looped end of the wire guard moves out of alignment with the plane of the hook and is thus no longer in engagement with the barbed end of the hook.

FIG. 3 is a pictorial view of one embodiment of the weedless hook according to the present invention.

FIG. 4 is an exploded view of a sheet metal guard shown in FIG. 3 prior to the guard being affixed to the hook.

DETAILED DESCRIPTION OF PREFERRED EMBODIMENTS

Figure 5:
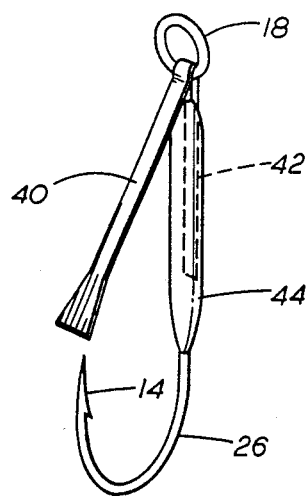
FIG. 5 is an alternate embodiment of a weedless hook according to the present invention.
Figure 6:
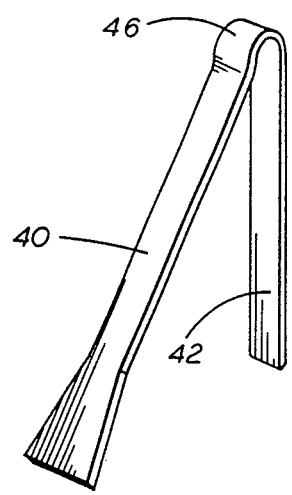
FIG. 6 is an enlarged view of the guard shown in FIG. 5.

A prior art weedless hook is shown in FIGS. 1 and 2, and has been discussed earlier. Five different embodiments of a weedless hook according to the present invention are depicted in FIGS. 3-11, and each of the embodiments are discussed separately below. For each of the embodiments discussed, like reference numerals will be used to describe like components.

A simplified weedless hook according to the present invention is depicted in FIG. 3. The hook 16 includes an eye 18, a shank portion 20, an arcuate portion 26, and a barbed tip 14. The shank is an elongate rod-like or wire member formed along a shank axis 24. The centerline CL of the entire length of the shank 20 and the arcuate portion 26 of the hook lies within a plane, hereinafter referred to as the hook plane. A sheet-like metal guard 30 is secured at end 28 to the hook 16, and has a free end 32 spaced between the eye 18 and the barbed tip 14.

The guard 30 may be stamp fabricated from a resiliently flexible metal sheet material, such as spring steel, brass, or monel, or the like. In order that the guard 30 be prohibited from moving substantially in a lateral direction perpendicular to the hook plane, the entire length of the elongate guard 30 from the hook end 28 to the free end 32 has a width of from about 0.03 inches to about 0.10 inches, depending on the size of the hook and thus the size of the fish intended to be caught. This sheet-like guard 30 has a corresponding thickness along at least a portion of this length of from about 0.006 inches to 0.020 inches, thereby providing high flexibility for the tip end 32 of the guard to move parallel to the hook plane and toward the shank axis 24. Accordingly, it should be understood that the guard of the present invention has a width at least three times the thickness of the guard, and preferably has a width approximately five times the thickness of the guard. Alternatively, only a portion of the guard may be resiliently flexible as explained subsequently.

The free end 32 of the stamped guard 30 is expanded at 33 from its normal width, so that the expanded width further minimizes the likelihood that the free end 32 of the guard will move laterally in a direction perpendicular to the hook plane and out of alignment with the barbed tip 14. The opposite end 28 of the guard 30 has a substantially enlarged or expanded portion 34 which is used for fixing the guard 30 to the shank 20 of the hook. To secure the guard 30 to the hook, the sides of the portion 34 may be bent to form a substantially U-shaped configuration for portion 34 and inserted through the eye 18 of the hook. Thereafter, this U-shaped configuration may be bent downward so that the shank 20 of the hook lies between the parallel sides of the portion 34. Thereafter, the sides may be further bent over so that the portion 34 forms a substantially sleeve-like member which fully encircles the shank portion 20 of the hook. This sleeve-like portion is shown as dashed lines in FIG. 4, but physically separate from the hook.

FIG. 3 thus illustrates the normal position of the guard 30 with respect to the hook 16 while the hook is moving through the water. A tip end 32 of the guard lies close to barbed tip 14 but is spaced slightly farther from the axis 24 of the shank 20 than the barbed tip 14, so that weeds will be easily moved out of engagement with the tip 14. It should be understood, however, that even if the tip 32 were spaced from the shank axis 24 the same distance as the tip 14, the guard 30 may nevertheless function to move the weeds out of engagement with the tip 14, since the fisherman normally moves the hook in the water at a sufficient speed that the diverted momentum of the weed causes the barb end 14 to pass by the weed. Also, it should be understood that if the barb 13 engages a tree branch or other relatively stable object, guard 30 effectively moves the hook 16 out of its normal path (rather than moving the snagging object out of the path of the hook), so that the tip 14 does not snag the branch.

A second embodiment of the weedless hook is shown in FIG. 5. The sheet metal guard 40 is bent at 46 so that leg portion 42 may be fitted through the eye 18 of the hook and against the shank of the hook. Thereafter, a weight 44 may be molded onto the shank of the hook, thereby securing the guard 40 to the hook. Alternatively, it should be understood that the leg portion 42 of the guard 40 may be soldered to the shank of the hook, may be string-wrapped to the hook in the manner as shown in FIGS. 1 and 2, or otherwise connected to the hook.

It is a preferred feature of the present invention that the guard 30 pass through the eye 18 of the hook, thereby maximizing the distance between the free end of the guard and the pivoting location of the guard on the hook, thus increasing the flexibility of the free end of the guard to move parallel to the hook plane. Moreover, the feature of passing the guard through the eye of the hook allows the hook guard of the present invention to be even more reliably utilized on small sized hooks, since the functional length of the elongate guard 40 is maximized. However, in less preferred embodiments, the guard may be attached to the hook shank without passing through the eye.

Figure 7:
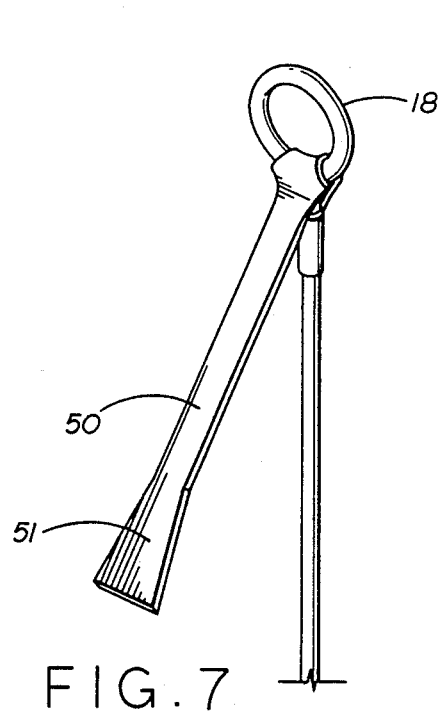
FIG. 7 is an alternate embodiment of a sheet metal guard secured to a portion of a hook.
Figure 8:
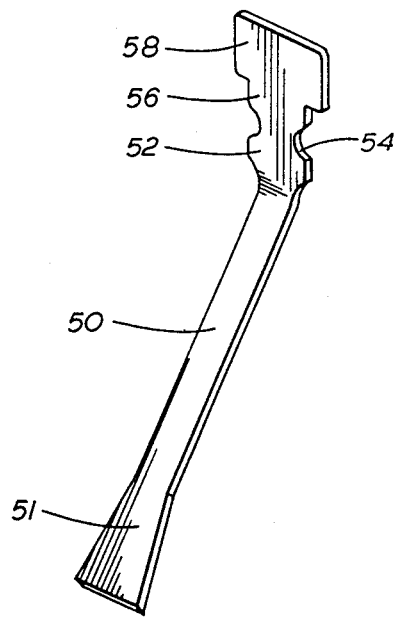
FIG. 8 is a pictorial view of the guard shown in FIG. 7 prior to the guard becoming bent for securing to the hook.

FIG. 7 discloses an alternate embodiment of a weedless hook guard according to the present invention. The guard 50 has an expanded width free end 51, as previously discussed. The opposing end has, in series moving from the free end 51, a first expanded portion 52, a reduced width or neck portion 54, an expanded portion 56, and a larger expanded portion 58 having a width greater than portions 52 and 56. The neck portion 54 is designed to enable the guard 50 to easily bend about the eye 18, while expanded diameter portions 52 and 56 serve to longitudinally pinpoint the location for the bend, and provide increased structural integrity for the guard as the portions 52 and 56 are sandwiched about the eye 18. The larger expanded portion 58 may be fitted through the eye 18 and serve the purpose and function of the portion 34 previously discussed.

Figure 9:
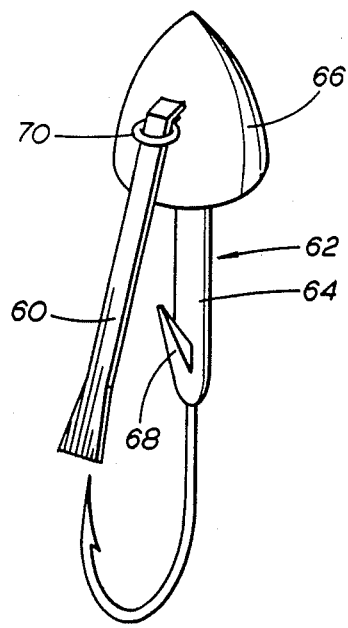
FIG. 9 is a pictorial view of a weedless hook according to the present invention with a weighted head for attaching a flexible material lure body.
Figure 10:
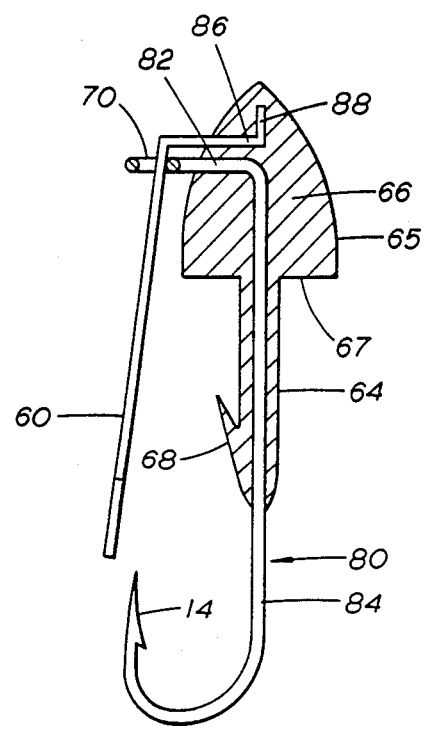
FIG. 10 is a side view, partially in cross-section, of the weedless hook shown in FIG. 9.

Still another embodiment of the weedless hook according to the present invention is depicted in FIGS. 9 and 10. The hook 80 includes a bend portion 82 between the shank 84 and the eye 70, such that the eye 70 is substantially spaced from the shank axis. A weighted head member 62 is formed on the hook for receiving an integral flexible material lure body, and includes a head portion 66 with a streamlined exterior configuration, a shaft portion 64, and a stud portion 68 projecting radially outward from the shaft portion 64 and toward the head portion 66. The head portion 66 has an exterior surface 65 with a forwardly directed profile and a rearwardly directed shoulder 67. The shaft portion 68 is positioned about the shank of the hook, as shown. Further details regarding the hook 80 and the weighted head member are disclosed in U.S. Pat. No. 4,672,768, hereby incorporated by reference.

The sheet-like metal guard 60 as shown in FIGS. 9 and 10 passes through the eye 70 of the hook then turns substantially 90° to form a first bend portion 86 substantially parallel to portion 82 of hook 80, then bends substantially 90° to form portion 88 substantially parallel to the shank portion 84 of the hook. Portions 86 and 88 may be imbedded into the head 66 of member 62, thereby securing the guard 60 in its desired position for deflecting weeds out of engagement with the hook tip 14. In this regard, the second bend portion 88 is optional, since portion 86 alone may secure the guard to the weighted head member. Also, the guard 60 need not pass through the eye 70 of the hook, so that portion 86 may be imbedded in head portion 66 either above or below portion 82. It should be understood that, in accordance with the disclosure of U.S. Pat. No. 4,672,768, a pliable lure body may be threaded onto the hook 80 and fitted onto the head member 62, with barb 68 serving to retain the lure against the head 66 while exposing the barb 14 for catching a fish.

Figure 11:
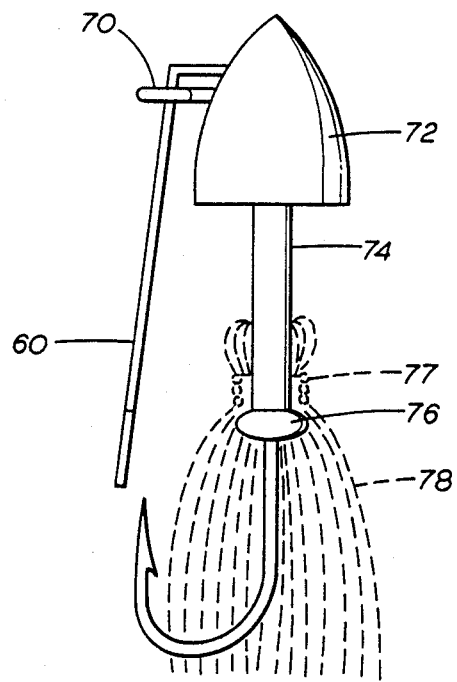
FIG. 11 is a side view of a weedless hook according to the present invention with one type of artificial lure secured to the weighted head.

Still another embodiment of a weedless hook according to the present invention is shown in FIG. 11. The guard 60 used for deflecting weeds may be identical to the guard 60 previously discussed, and the portions 72 and 74 of the member may be structurally and functionally identical to the portions 66 and 64, respectively. An expanded diameter portion 76 replaces the barb 68, however, and a conventional multistring bass lure or feather 78 is retained on the shaft 74 by the string-like wrappings 78. The lure 78 is thus prevented from sliding along the shaft 74 and away from the head 72 by the expanded diameter portion 76.

Various other changes and modifications to the embodiments described herein will be suggested from the above disclosure. It should be understood, for example, that the guard as shown in FIGS. 3–8 need not pass through the eye of the hook, and may be secured to the hook by various techniques, such as by a lead weight about the hook shank as shown in FIGS. 9–11. The weedless hook of the present invention may be used with natural or artificial bait, and with lures of various types and sizes. Although a barbed end to the hook is preferred, the hook could be provided with a pointed but not barbed end for catching fish.

It should be understood that the entire cantilevered portion of the sheet-like guard typically has a substantially uniform width, and that the free end optionally may be expanded slightly as discussed herein. The width of the guard could, however, vary along its cantilevered length, although the guard should maintain a width greater than its thickness along its entire cantilevered length so that the guard cannot flex substantially in a direction perpendicular to the hook plane. For ease of manufacturing, the thickness of the guard is preferably uniform, although the thickness of the guard could also vary substantially along the length of the guard, provided the tip end can move easily towards the shank of the hook due to flexing of the guard in the vicinity of the thin guard portions.

Those skilled in the art will also understand that a substantial length of the guard may be functionally rigid, providing the rigid guard portion is connected to the hook by a resiliently flexible sheet metal portion as described herein, wherein the latter portion has a width which prohibits movement of the free end of the rigid portion transverse to the hook plane while enables the free end to easily move toward the shank of the hook. Alternatively, a functionally rigid guard portion could be secured to and project from the hook, and a flexible sheet-like portion of the guard as described herein may then be connected to the rigid member and extend toward the barbed end of the hook. Thus the resiliently flexible portion of the guard has a width substantially greater than its thickness, so that the face end may move within the hook plane while remaining substantially rigid in a direction perpendicular to the hook plane. All of these variations are thus included within the concept of the present invention.

While most hooks include a shank portion and an arcuate portion (with a tip at an end of the shank portion) each with a centerline which lies within and thereby defines a hook plane, the concept of the present invention is applicable to hooks with an "offset tip", wherein the arcuate portion is U-shaped in both a side view and an end view, so that the tip is offset or spaced from the conventional hook plane. Also, the concept of the present invention may be used with a hook having a "bowed" shank with a non-linear centerline, wherein the centerline of the arcuate portion defines the hook plane, and the centerline of the shank of the hook is bowed and thus spaced from the conventional hook plane. In either of these cases, or their combination, a center point of that portion of the hook shank to which the guard is fixed and from which the cantilevered guard projects (the center point being along the shank centerline and axially at the mid of the securing portion, which as previously noted as typically adjacent the hook eye), and the tip end of the arcuate portion of the hook define a tip-to-shank-securing-portion line. The free end of the guard is normally spaced from this line such that the lateral midpoint or center of the width of the free end of the tip-to-shank-securing-portion line define a hook plane. Accordingly, the reduced thickness of the guard permits the free end and the guard as disclosed herein to move or flex within this hook plane to expose the tip of the hook and thus catch a fish, while the guard is normally prevented from moving or flexing in a direction perpendicular to the hook plane due to the thickness of the guard.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A fishing hook for catching fish in water containing weeds or similar objects which may inadvertently snag or contaminate the hook, the fishing hook comprising:
    a hook having an elongate shank lying along a shank axis, an eye at one end of the shank, and an arcuate portion at an opposing end of the shank and having a barbed tip;
    an elongate sheet-like metallic guard secured at one end to securing portion of the hook adjacent the eye, the one end passing through the eye of the hook and having a reduced width portion for wrapping about an eye portion of the hook and an increased width portion for wrapping about the shank portion at the hook;
    the sheet-like metallic guard having an opposing free end normally spaced between the barbed tip and the eye, and a flexible portion between the one end and the opposing free end for enabling movement of the free end with respect to the hook;
    a center point of the securing portion of the hook and the barbed tip of the arcuate portion defining a tip-to-shank-securing-portion line, and a lateral midpoint of the free end of the sheet-like guard and the tip-to-shank-securing-portion line defining a hook plane, the free end of the sheet-like guard spaced in the hook plane to normally deflect the weeds around the barbed tip;
    the flexible portion of the sheet-like metallic guard having a width substantially perpendicular to the hook plane and being substantially greater than its thickness, such that the width of the flexible portion normally prevents the free end of the guard from moving in a direction perpendicular to the hook plane and out of alignment for protecting the barbed tip, and such that the thickness of the flexible portion allows movement of the free end within the hook plane toward the shank axis to expose the barbed tip so as to hook the fish.

2. A fishing hook as defined in claim 1, wherein the flexible portion of the sheet-like metallic guard has a width to thickness ratio of at least 3:1.

3. A fishing hook as defined in claim 1, wherein the free end of the sheet-like metallic guard has an expanded width portion for maintaining at least a portion of the free end within the hook plane.

4. A fishing hook as defined in claim 1, wherein the sheet-like metallic guard is wrapped circumferentially about the hook shank to connect the guard to the hook.

5. A fishing hook as defined in claim 1, wherein the free end of the sheet-like metallic guard is normally spaced from the shank axis a distance of at least the spacing between the shank axis and the barbed tip.

6. A fishing hook as defined in claim 1, wherein the sheet-like metallic guard is fabricated from a group consisting of spring steel, brass, and monel.

7. A fishing hook as defined in claim 1, further comprising:
    a weight member secured to the shank of the hook; and
    the one end of the guard is secured to the hook by the weight member.

8. A fishing hook as defined in claim 7, wherein the weight member comprises:
    a head portion having an exterior streamlined surface;
    a shaft portion positioned about the shank of the hook; and
    a stud portion projecting radially outward from the shaft portion for connecting a lure to the weight member.

9. A fishing hook for minimizing inadvertent snagging or contamination of the hook, the fishing hook comprising:
    hook means having an elongate shank lying along a shank axis, an eye at one end of the shank, and an arcuate portion at an opposing end of the shank and having a tip, a centerline of the arcuate portion of the hook means lying within and defining a hook plane;
    sheet-like guard means passing though the eye of the hook means and at a fixed end to the shank of the hook means, the fixed end of the guard means having a reduced width portion for wrapping about the eye of the hook means and an increased width portion for wrapping about the shank of the hook for fixedly connecting the guard means to the hook shank and having an opposing free end adjacent the tip of the arcuate portion, the free end of the sheet-like guard normally spaced from the shank axis a distance greater than the spacing between the shank axis and the tip of the hooks means, the free end being positioned at least partially within the hook plane; and
    the sheet-like guard means including a substantially planar resilient portion extending between the fixed end and the free end for flexing to move the free end with respect to the hook means, the substantially planar resilient portion having a width substantially greater than its thickness, such that the width of the resilient portion normally prevents the free end of the guard means from moving in a direction perpendicular to the hook plane and out of alignment for protecting the tip, and such that the thickness of the resilient portion allows flexing movement of the free end within the hook plane toward the shank axis to expose the tip.

10. A fishing hook as defined in claim 9, wherein the resilient portion of the sheet-like guard means has a width to thickness ratio of at least 3:1.

11. A fishing hook as defined in claim 10, wherein substantially the entire length of the guard means between the fixed end and the free end has a width to thickness ratio of about 5:1.

12. A fishing hook for catching fish while minimizing inadvertent snagging or contamination of the hook, the fishing hook comprises:

a hook having an elongate shank lying along a shank axis, an eye at one end of the shank, and an arcuate portion at an opposing end of the shank and having a barbed tip, a centerline of the arcuate portion of the hook lying within and defining a hook plane;

an elongate sheet-like guard passing through the eye of the hook and secured at a fixed end to the hook shank, the sheet-like guard having a reduced width portion for wrapping about the eye of the hook and an increased width portion for wrapping about the shank of the hook;

the sheet-like guard having an opposing free end adjacent the barbed tip of the arcuate portion of the hook, and normally spaced from the shank axis a distance greater than the spacing between the shank axis and the barbed tip of the hook; and the sheet-like guard including a substantially planar resilient portion extending between the fixed end and the free end for flexing to move the free end with respect to the hook, the substantially planar resilient portion having a width substantially greater than its thickness, such at the width of the resilient portion normally prevents the free end of the guard from flexing in a direction perpendicular to the hook plane and out of the alignment for protecting the barbed tip, and such that the thickness of the resilient portion allows flexing movement of the free end within the hook plane toward the shank axis to expose the tip for catching the fish.

13. A fishing hook as defined in claim 12, wherein the increased width portion of the sheet-like guard is wrapped circumferentially about the shank of the hook to connect the guard to the hook.

14. A fishing hook as defined in claim 13, wherein the increased width portion of the sheet-like guard is fixedly clamped about the shank of the hook.

15. A fishing hook is a defined in claim 12, wherein the free end of the guard is continuously spaced along the shank axis from the barbed tip.

16. A fishing hook is defined in claim 12, wherein the resilient portion of the sheet-like guard has a width to thickness ratio of at least 3:1.

17. A fishing hook is defined in claim 12, wherein the substantially the entire length of the guard between the fixed end and the free end has a width to thickness ratio of about 5:1.

* * * * *

UNITED STATES PATENT AND TRADEMARK OFFICE
CERTIFICATE OF CORRECTION

PATENT NO. : 4,899,483

DATED : February 13, 1990

INVENTOR(S) : Aaron J. Pippert

It is certified that error appears in the above-identified patent and that said Letters Patent is hereby corrected as shown below:

In column 7, line 45, after "to" insert --a--.

Signed and Sealed this

Eighth Day of January, 1991

*Attest:*

HARRY F. MANBECK, JR.

*Attesting Officer*     *Commissioner of Patents and Trademarks*